United States Patent
Sanson et al.

(10) Patent No.: US 12,461,224 B2
(45) Date of Patent: Nov. 4, 2025

(54) VELOCITY DISAMBIGUATION FOR RADAR SENSOR SYSTEM

(71) Applicant: GM Cruise Holdings LLC, San Francisco, CA (US)

(72) Inventors: Jessica Bartholdy Sanson, Munich (DE); Andreas Barthelme, Munich (DE); Andre Giere, Oberpframmern (DE); Johanna Gütlein-Holzer, Munich (DE)

(73) Assignee: GM Cruise Holdings LLC, San Francisco, CA (US)

( * ) Notice: Subject to any disclaimer, the term of this patent is extended or adjusted under 35 U.S.C. 154(b) by 360 days.

(21) Appl. No.: 17/877,942

(22) Filed: Jul. 30, 2022

(65) Prior Publication Data

US 2024/0036187 A1     Feb. 1, 2024

(30) Foreign Application Priority Data

Jul. 28, 2022   (EP) .................... 22187567

(51) Int. Cl.
  *G01S 13/58*   (2006.01)
  *G01S 7/35*    (2006.01)
  *G01S 13/931*  (2020.01)

(52) U.S. Cl.
  CPC .......... *G01S 13/584* (2013.01); *G01S 7/356* (2021.05); *G01S 13/931* (2013.01)

(58) Field of Classification Search
  CPC ...... G01S 13/584; G01S 7/356; G01S 13/931; G01S 7/354; G01S 13/28; G01S 13/343; G01S 13/36; G01S 13/505; G01S 13/605; G01S 13/93; G01S 7/0232; G01S 7/0235; G01S 13/933; G01S 7/352; G01S 7/35; G01S 13/02; G01S 13/904; G01S 2013/0281; G01S 7/4021; G01S 13/44; G01S 13/345; G01S 2013/932; G01S 2013/9322; G01S 2013/9325; G01S 2013/93271; G01S 13/34–13/95; G01S 7/28–41; G01S 15/00–96;
  (Continued)

(56) References Cited

U.S. PATENT DOCUMENTS

| | | | |
|---|---|---|---|
| 6,477,553 B1 * | 11/2002 | Druck ................ | H03M 1/1265 708/405 |
| 2012/0001791 A1 * | 1/2012 | Wintermantel ....... | G01S 7/0233 342/109 |

(Continued)

*Primary Examiner* — Vladimir Magloire
*Assistant Examiner* — Remash R Guyah
(74) *Attorney, Agent, or Firm* — Honigman LLP; Matthew H. Szalach; Jonathan P. O'Brien

(57) ABSTRACT

Various technologies described herein pertain to disambiguating velocity estimate data of a radar sensor system. First range estimate data can be computed based on samples from a period of a ramp for each ramp in a sequence. First velocity estimate data can be computed based on samples from a range bin across the ramps in the sequence for each range bin. For each of the ramps in the sequence, samples from a period of a ramp can be divided into a plurality of groups of the samples respectively from periods of subramps. The first velocity estimate data can be disambiguated to generate second velocity estimate data. The first velocity estimate data can be disambiguated based on the plurality of groups of the samples respectively from the periods of the subramps.

16 Claims, 10 Drawing Sheets

(58) Field of Classification Search
CPC ........ H03H 17/02–08; G06F 17/14–18; H04L 27/00–38; G01R 23/00–20; B60W 30/09–16
USPC ....... 342/25, 70–196; 367/87–103, 127–135; 702/104–106, 189–190; 375/240.01–240.29, 346–349; 455/12.1, 455/13.1–13.4, 39, 67.11, 67.13, 67.16, 455/67.7, 132, 143, 226.1–226.4
See application file for complete search history.

(56) References Cited

U.S. PATENT DOCUMENTS

| | | | |
|---|---|---|---|
| 2018/0045819 A1* | 2/2018 | Cornic | G01S 13/34 |
| 2019/0361113 A1* | 11/2019 | Ray | H03D 3/009 |
| 2019/0391250 A1* | 12/2019 | Cohen | G01S 13/87 |
| 2022/0236399 A1* | 7/2022 | Subburaj | G01S 13/42 |

* cited by examiner

VELOCITY DISAMBIGUATION FOR RADAR SENSOR SYSTEM

RELATED APPLICATION

This application claims priority to European Patent Application No. EP22187567.7, filed on Jul. 28, 2022, and entitled "VELOCITY DISAMBIGUATION FOR RADAR SENSOR SYSTEM". The entirety of this application is incorporated herein by reference.

BACKGROUND

In connection with navigating an environment, an autonomous vehicle perceives objects surrounding the autonomous vehicle based upon sensor signals generated by sensor systems of the autonomous vehicle. For example, the autonomous vehicle may include a sensor system, such as a radar sensor system, for generating sensor signals. The autonomous vehicle also includes a centralized processing device that receives data based upon sensor signals generated by the sensor system and performs a variety of different tasks, such as detection of vehicles, pedestrians, and other objects. Based on an output of the processing device, the autonomous vehicle may perform a driving maneuver.

Radar sensor systems exhibit some advantages over other sensor systems such as lidar sensor systems and cameras with respect to their usage in autonomous vehicles. For instance, compared to cameras and lidar sensor systems, performance of radar sensor systems is more invariant to weather changes, such that data generated by a radar sensor system can be used to enable autonomous driving under certain weather conditions (such as heavy rain or snow). In addition, radar sensor systems are able to capture velocity information nearly instantaneously. Further, radar sensor systems have a greater range than cameras and lidar sensor systems.

Radar sensor systems emit radar signals into a surrounding environment. The radar sensor signals reflect off objects in the environment and the radar system then detects the reflected radar signals. Conventionally, the radar sensor system is configured to construct data tensors based upon the reflected radar signals, where a data tensor has bins across several dimensions. Example dimensions include range, doppler, and beam. The radar sensor system then generates point clouds based upon the data tensors and transmits the point clouds to the centralized processing device, where the centralized processing device identifies objects in the environment of the autonomous vehicle based upon the point clouds.

Range resolution of a radar sensor system is a function of the bandwidth of a radar signal transmitted by the radar sensor system. All else being equal, employing a wider bandwidth radar signal to be transmitted by the radar sensor system generally provides a finer range resolution (as compared to range resolution provided by a radar sensor system that utilizes a narrower bandwidth radar signal). In various applications, such as radar sensor systems of vehicles (e.g., autonomous vehicles), it is desired to have relatively fine range resolution; thus, such systems commonly employ relatively wide bandwidth radar signals.

However, as bandwidth of radar signals to be transmitted by conventional radar sensor systems increases, unambiguous velocity detectable by such radar sensor systems typically decreases. A relatively low pulse repetition interval (PRI) can generally allow for a relatively high unambiguous velocity. Yet, as noted above, relatively wider bandwidth radar signals are utilized to achieve finer range resolutions. Due to limitations of analog to digital converter (ADC) sampling rates, increasing the bandwidth of the radar signals can result in increasing the PRI of the radar signals, which in turn decreases the unambiguous velocity. Thus, due to hardware limitations, conventional radar sensor systems oftentimes are unable to provide relatively fine range and angular resolution while also providing relatively high unambiguous velocity.

SUMMARY

The following is a brief summary of subject matter that is described in greater detail herein. This summary is not intended to be limiting as to the scope of the claims.

Described herein is a radar sensor system configured to disambiguate velocity estimate data. First range estimate data can be computed based on samples from a period of a ramp for each ramp in a sequence. First velocity estimate data can be computed based on samples from a range bin across the ramps in the sequence for each range bin. For each of the ramps in the sequence, samples from a period of a ramp can be divided into a plurality of groups of the samples respectively from periods of subramps. The first velocity estimate data can be disambiguated to generate second velocity estimate data. The first velocity estimate data can be disambiguated based on the plurality of groups of the samples respectively from the periods of the subramps.

In various embodiments, the radar sensor system can include a transmit antenna and a receive antenna. The transmit antenna can be configured to transmit a radar signal into an environment of the radar sensor system, where the radar signal includes a sequence of ramps, and each of the ramps has a bandwidth and a period. The receive antenna can be configured to receive a return signal from the environment of the radar sensor system responsive to the radar signal. The radar sensor system can also include radar processing circuitry that is configured to perform several acts. The acts include receiving radar data indicative of the return signal received at the receive antenna. Further, the acts include computing first range estimate data based on the radar data, where the first range estimate data is computed based on samples from a period of a ramp for each of the ramps. The acts also include computing first velocity estimate data based on the radar data, where the first velocity estimate data is computed based on samples from a range bin across the ramps in the sequence for each range bin. Moreover, the acts include dividing, for each of the ramps in the sequence, samples from a period of a ramp into a plurality of groups of the samples respectively from periods of subramps. The acts further include disambiguating the first velocity estimate data to generate second velocity estimate data, where the first velocity estimate data is disambiguated based on the plurality of groups of the samples respectively from the periods of the subramps. The acts also include outputting the first range estimate data and the second velocity estimate data.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
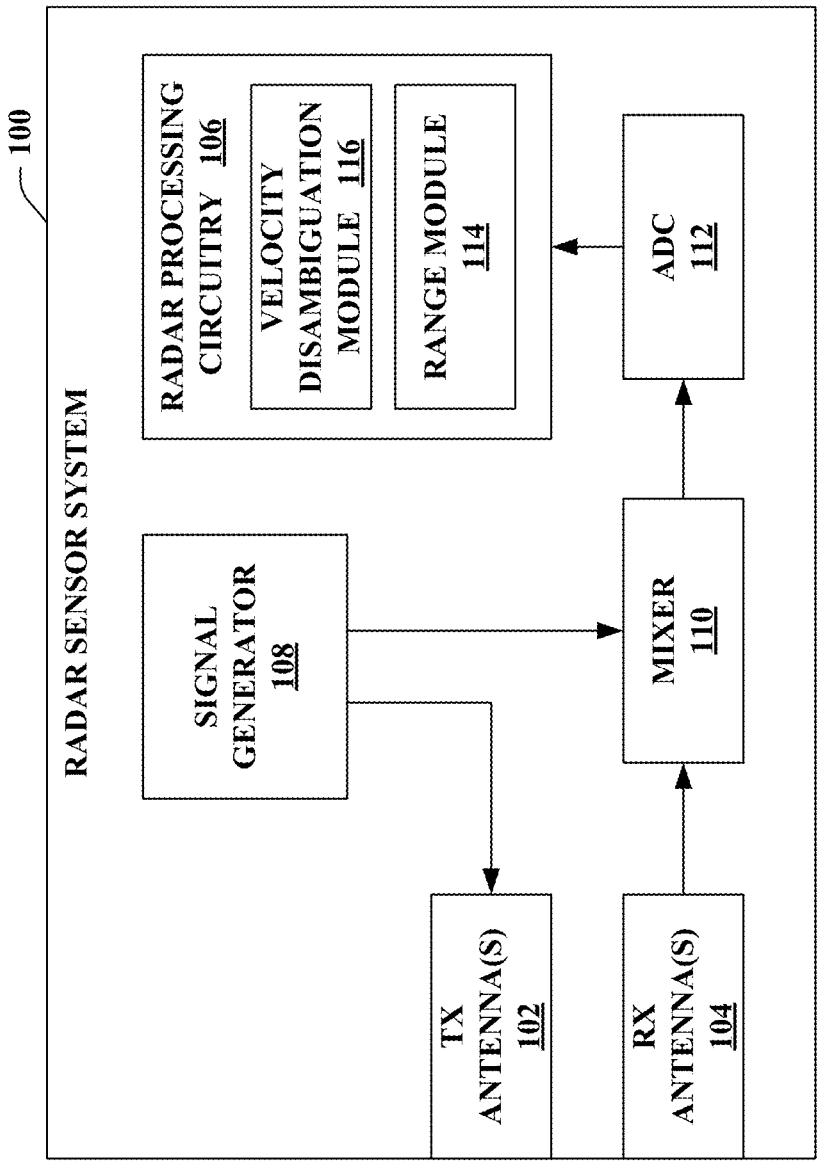
FIG. 1 illustrates a functional block diagram of an exemplary radar sensor system.

Various technologies pertaining to processing radar data in a radar sensor system of an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Examples set forth herein pertain to an autonomous vehicle including a radar sensor system that disambiguates velocity utilizing the techniques set forth herein. It is to be understood, however, that the radar sensor system described herein can be employed in a variety of different scenarios, such as flight, in drone technologies, in monitoring technologies (e.g., security technologies), and so forth. Autonomous vehicles are set forth herein as one possible use case, and features of the claims are not to be limited to autonomous vehicles unless such claims explicitly recite an autonomous vehicle.

Referring now to the drawings, FIG. 1 illustrates an exemplary radar sensor system 100. The radar sensor system 100 includes a transmit antenna 102, a receive antenna 104, and radar processing circuitry 106. While one transmit antenna 102 and one receive antenna 104 are depicted in FIG. 1, it is contemplated that the radar sensor system 100 can include substantially any number or transmit antennas (each substantially similar to the transmit antenna 102) and/or substantially any number of receive antennas (each substantially similar to receive antenna 104). In exemplary embodiments, various components of the radar sensor system 100 can be integrated as a same system-on-a-chip (SoC). According to other embodiments, one or more components of the radar sensor system 100 can be discrete component(s). Moreover, in various embodiments, the radar sensor system 100 can be employed on a vehicle, such as a land vehicle (e.g., an autonomous vehicle) or an aircraft, to identify positions and velocities of objects in an environment of the vehicle; yet, the radar sensor system 100 can alternatively be employed in other sorts of systems and scenarios other than vehicles or aircrafts.

The transmit antenna 102 is configured to transmit a radar signal into an environment of the radar sensor system 100. Moreover, the receive antenna 104 is configured to receive a return signal from the environment of the radar sensor system responsive to the radar signal. For instance, the radar signal transmitted into the environment can be at least partially reflected by an object in the environment; the radar signal reflected by the object that propagates back to the radar sensor system 100 can be the return signal received by the receive antenna 104. As described in greater detail below, the radar processing circuitry 106 is configured to compute target solutions indicating estimated positions and/or velocities of objects based on the return signal received by the receive antenna 104. As compared to conventional approaches, the radar processing circuitry 106 can provide relatively fine range and angular resolution while also providing relatively high unambiguous velocity. The radar processing circuitry 106 can be configured to compute velocity estimate data with a modified discrete Fourier transform (DFT). The velocity estimate data can be generated by the radar processing circuitry 106 based on different doppler effects that a target suffers across the signal frequency as opposed to just at a central frequency.

The radar sensor system 100 can further include a signal generator 108 configured to generate the radar signal for transmission by way of the transmit antenna 102. The radar signal generated by the signal generator 108 can be an analog signal having various desired signal characteristics. For example, the radar signal generated by the signal generator 108 can be a frequency modulated continuous wave (FMCW) radar signal. Following this example, the signal generator 108 can control characteristics of the FMCW radar signal such as pulse shape, bandwidth of a pulse, pulse repetition interval (PRI), period of a pulse (e.g., period of a ramp), slope of a pulse, start frequency of a pulse, and the like. While many of the examples set forth herein describe the radar signal as being an FMCW radar signal, it is to be appreciated that these examples can be extended to other types of radar signals transmitted in steps, linear ramps, etc. (e.g., stepped orthogonal frequency division multiplexing (OFDM) radar, stepped phase modulated continuous wave (PMCW) radar, etc.). For instance, unambiguous velocity can similarly be limited in radar sensor systems that digitally modulate the radar signal based on stepped modulation, such as stepped carrier OFDM radar; thus, the examples set forth herein can be extended to the radar signal generated by the signal generator 108 being an OFDM radar signal in other embodiments.

Moreover, the radar sensor system 100 can include a mixer 110 and an analog to digital converter (ADC) 112. The mixer 110 can be configured to mix the radar signal generated by the signal generator 108 and the return signal received by the receive antenna 104 to output a mixed signal. Further, the ADC 112 can be configured to sample the mixed signal to output radar data. The ADC 112 can digitally sample the mixed signal and output digital values that are indicative of amplitude of the mixed signal over time. The digital values outputted by the ADC 112 are collectively referred to herein as radar data. Thus, the radar data outputted by the ADC 112 are indicative of the return signal received at the receive antenna 104. Although not shown, it is to be appreciated that the radar sensor system 100 can further include other components that can perform various analog signal processing operations over the radar signals and/or return signals, such as amplifiers, filters, and the like.

Figure 2:
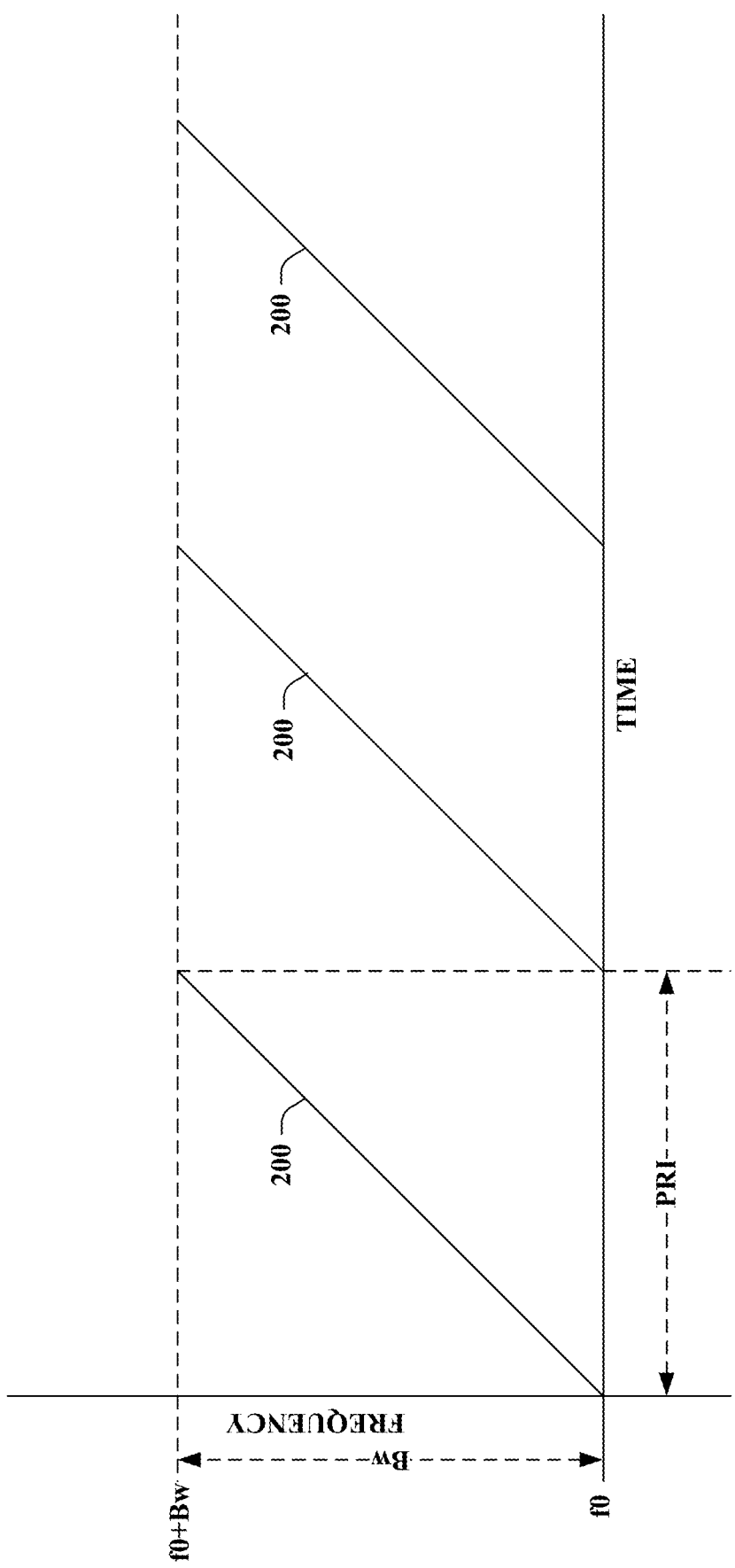
FIG. 2 illustrates an exemplary radar signal that includes a sequence of ramps.

According to an example, the radar signal generated by the signal generator 108 and transmitted by the transmit antenna 102 can include a sequence of ramps, where each of the ramps has a bandwidth and a period. FIG. 2 illustrates an example of such a radar signal that includes a sequence of ramps 200. As depicted, each ramp 200 can have bandwidth Bw, a start frequency f0, and an end frequency f0+Bw. Moreover, the PRI of the radar signal is shown in FIG. 2. The PRI is the time between two ramps 200. The PRI and the period of a ramp can differ in various embodiments (e.g., the period of the ramp can be a duration of time corresponding to the ramp being at the start frequency to the end frequency). The radar signal can include N ramps in a coherent pulse interval (CPI).

Reference is again made to FIG. 1. The ADC 112 can digitally sample the mixed signal outputted by the mixer 110 a number of times within a period of a ramp. For instance, the ADC 112 can output L samples from a period of a ramp. The ADC 112 can similarly sample each of the ramps. Thus, within a CPI, the ADC 112 can output radar data as a radar matrix that includes L samples in fast time for each of the N ramps (e.g., the radar matrix can include L cells in fast time by N cells in slow time). Although not shown, it is contemplated that the radar sensor system 100 can include multiple receive channels; thus, the data matrices from each of the receive channels can be stacked to form a radar data cube (e.g., the radar data can be outputted as a radar data cube). Operations described herein as being applied to a data matrix can similarly be applied across other data matrices of a radar data cube.

In a conventional approach, range estimate data and velocity estimate data can be computed based on the radar data. In such a conventional approach, the range estimate data can be computed based on samples from a period of a ramp for each of the ramps. For instance, a Fast Fourier Transform (FFT) can be applied along the L samples from a single ramp in fast time to provide different range bins; the foregoing can be repeated along each of the ramps. Moreover, the velocity estimate data can be computed based on samples from a range bin across the ramps in the sequence for each range bin. An FFT can be applied along the N samples from a single range bin in slow time to provide different doppler bins; the foregoing can be repeated along each of the range bins.

The range resolution of a traditional radar sensor system (i.e., a minimum difference in range between two objects that is unambiguously distinguishable by the radar sensor system) is limited by the bandwidth of the radar signal emitted by the radar sensor system. The range resolution $S_r$ of a radar sensor system can be given by $S_r = c/2Bw$, where $S_r$ is the minimum difference in range between two objects that is unambiguously distinguishable by the radar sensor system, c is the speed of light in the medium through which the radar signal emitted by the radar sensor system is propagating, and Bw is the bandwidth of the radar signal (e.g., an example of which is depicted in FIG. 2).

As noted above, as the bandwidth of the radar signal increases, then the range resolution decreases (e.g., the range resolution becomes finer), which oftentimes is desirable. Yet, as the bandwidth increases, the PRI of the radar signal can increase due to ADC sampling rate limitations, which in turn decreases the unambiguous velocity of conventional radar sensor systems (e.g., the unambiguous velocity can conventionally be inversely proportional to the PRI). In contrast, the radar sensor system 100 can increase the unambiguous velocity as compared to conventional radar sensor systems while also providing relatively fine range resolution.

More particularly, the radar processing circuitry 106 can receive the radar data indicative of the return signal received at the receive antenna 104. The radar processing circuitry 106 can include a range module 114 and a velocity disambiguation module 116. The range module 114 can be configured to compute first range estimate data based on the radar data. The first range estimate data can be computed by the range module 114 based on samples from a period of a ramp for each of the ramps of the radar signal. The range module 114 can apply an FFT along the L samples from a single ramp in fast time to provide different range bins. The range module 114 can similarly apply FFTs along the samples respectively from the other ramps in fast time. Thus, the first range estimate data outputted by the range module 114 can have a range resolution given by $S_r = c/2Bw$.

Moreover, the velocity disambiguation module 116 can be configured to compute velocity estimate data having a higher unambiguous velocity as compared to conventional approaches. The velocity disambiguation module 116 can compute the velocity estimate data having the higher unambiguous velocity by evaluating different doppler effects for a target at different frequencies of a ramp as opposed to just at a center frequency of the ramp. The velocity disambiguation module 116 can compute the velocity estimate data utilizing a modified DFT.

More particularly, for each ramp in the sequence of ramps of the radar signal, the ramp can be divided into plurality of subramps. Thus, the velocity disambiguation module 116 can compute the velocity estimate data based on samples from the subramps. Accordingly, a value of the unambiguous velocity for the velocity estimate data computed by the velocity disambiguation module 116 can be based on a PRI of a subramp as opposed to the PRI of the complete ramp.

According to various embodiments, the velocity disambiguation module 116 can be applied in post-processing as a disambiguation technique. Thus, the range module 114 can compute the first range estimate data and a doppler module can compute a first velocity estimate data (e.g., standard range and velocity processing can be performed); thereafter the velocity disambiguation module 116 can be configured to disambiguate the first velocity estimate data. Pursuant to other embodiments, the velocity disambiguation module 116 can be used in place of a standard velocity processing technique as opposed to as a post processing approach. Moreover, the radar processing circuitry 106 can output the first range estimate data computed by the range module 114 and the velocity estimate data computed by the velocity disambiguation module 116.

Figure 3:
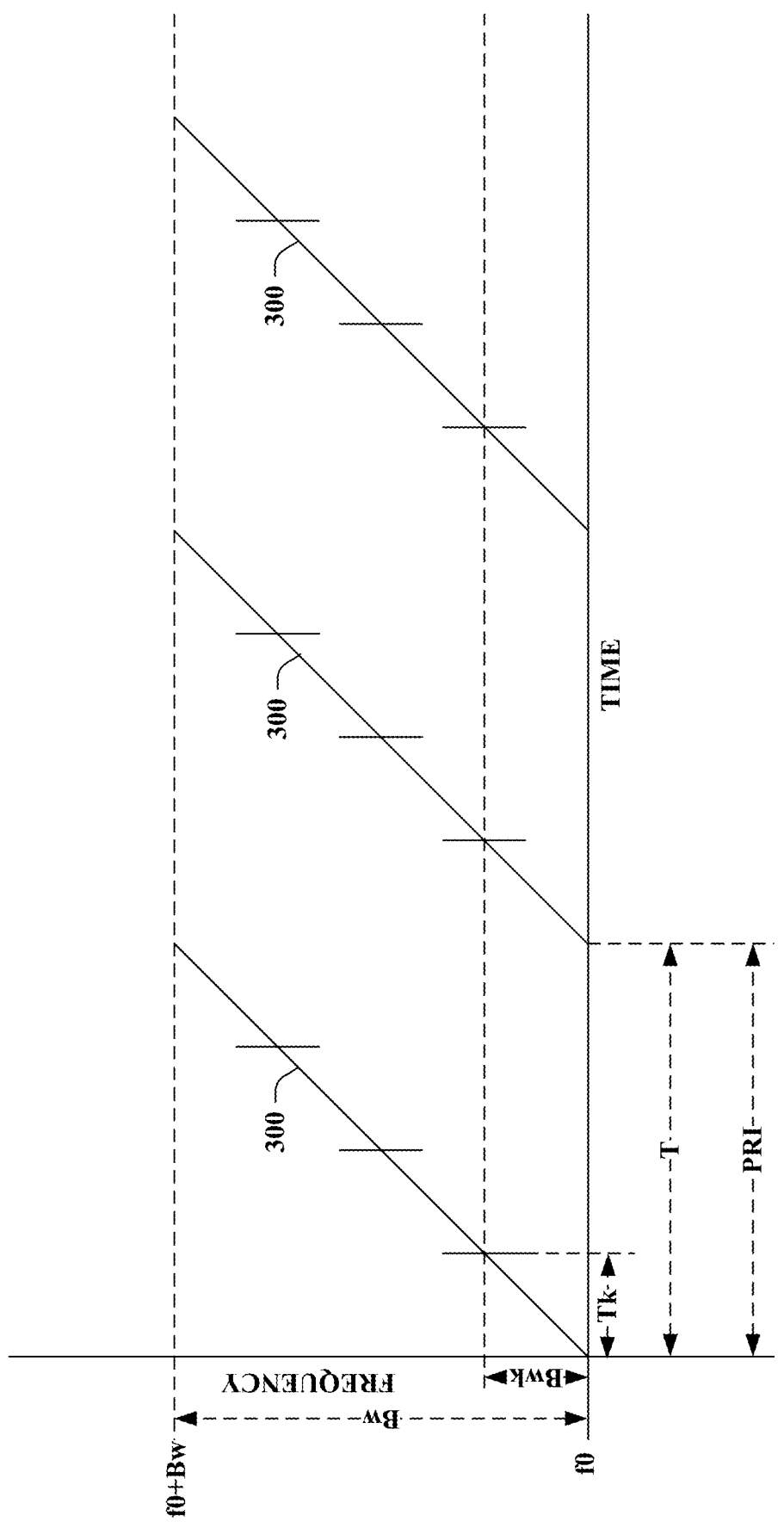
FIG. 3 illustrates an exemplary radar signal that includes a sequence of ramps, where the ramps are divided into subramps.

With reference to FIG. 3, illustrated is an exemplary radar signal that includes a sequence of ramps 300, where the ramps 300 are divided into subramps. Similar to the example shown in FIG. 2, a full bandwidth of the radar signal is Bw (e.g., the bandwidth of each ramp 300 is Bw). A period T of a ramp 300 is divided into a plurality of subramps. Each subramp has a portion of the full bandwidth Bwk (e.g., a subband) and a period Tk. In the example of FIG. 3, a ramp 300 is divided into four subramps; yet, it is contemplated that ramps of the radar signal can be divided into differing numbers of subramps other than four. Further, a frequency rate of the radar signal (e.g., a slope of a ramp 300) is represented as β.

The radar signal (e.g., generated by the signal generator 108 and transmitted into the environment by the transmit antenna 102) can be represented as:

$$x(k,t) = \exp(1j*2*pi*((f0 + \text{delta\_}f(k))*t + \frac{1}{2}*\beta*t^2))$$

with m=0, . . . , M−1 and 0<=t<Tk. T is the period of a ramp 300 (e.g., period of a pulse), Tk is a period of a subramp, k is a subramp index and denotes slow time, M is a number of subramps in a CPI, β represents the slope of a ramp 300, f0 is a start frequency of a ramp 300, and delta_f(k) is a frequency shift of subramp m. The number of subramps (M) can be a number of ramps 300 in the CPI (N) times the number of subramps into which each ramp 300 is divided.

As set forth above, the mixer 110 can mix the radar signal generated by the signal generator 108 and the return signal received by the receive antenna 104 to output the mixed signal. The mixed signal can be represented as:

$$y(k,t) = \exp(1j*2*pi*((f0 + \text{delta\_}f(k))*(-td) - \beta*(t*td)))$$

with td=2*(R0+kV0*t)/c. Moreover, td is a time delay to reception of the return signal (e.g., the reflected signal), R0 is a target range, V0 is a target velocity, and c is the speed of light.

Figure 4:
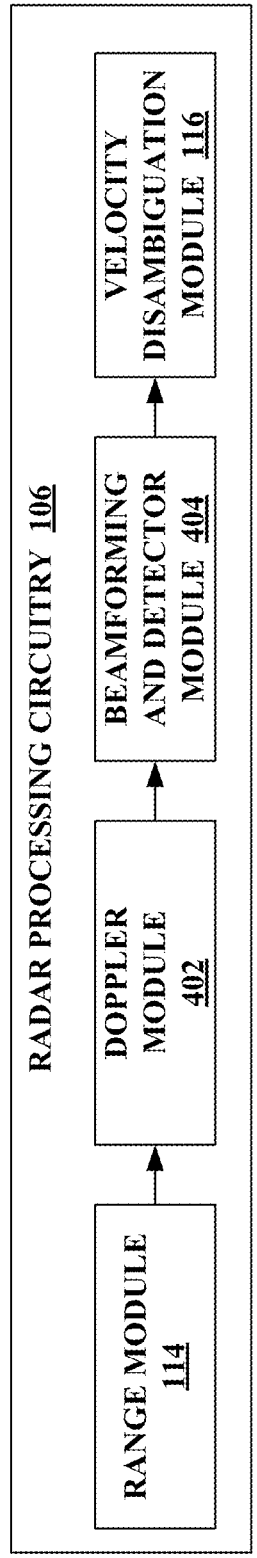
FIG. 4 illustrates a functional block diagram of exemplary radar processing circuitry of a radar sensor system.

Turning to FIG. 4, illustrated is an example of the radar processing circuitry 106. As described above, the radar signal can include a sequence of ramps, where each of the ramps has a bandwidth and a period; for instance, N ramps can be included in a CPI. The radar processing circuitry 106 includes the range module 114 and the velocity disambiguation module 116. Moreover, in the example of FIG. 4, the radar processing circuitry 106 further includes a doppler module 402 and a beamforming and detector module 404. The radar processing circuitry 106 can receive the radar data indicative of the return signal. For instance, a radar matrix that includes L cells in fast time and N cells in slow time can be received by the radar processing circuitry 106 (or a radar data cube that includes a plurality of such radar matrices can be received).

The range module 114 can be configured to compute first range estimate data based on the radar data; the first range estimate data can be computed based on samples from a period of a ramp for each of the ramps. The range module 114 can apply an FFT along the L samples from a single ramp in fast time to provide different range bins. The range module 114 can similarly apply FFTs along the samples respectively from the other ramps in fast time. Thus, the range module 114 can use samples from an entire ramp (for each of the ramps) to compute the first range estimate data. The first range estimate data can have a relatively fine range resolution based on the full bandwidth of the ramps in the sequence of the radar signal.

Further, the doppler module 402 can be configured to compute first velocity estimate data based on the radar data. The first velocity estimate data can be computed by the doppler module 402 based on samples from a range bin across the ramps in the sequence for each range bin. The doppler module 402 can apply an FFT along the N samples from a single range bin in slow time to provide different doppler bins. The doppler module 402 can similarly apply FFTs along the samples respectively from the other range bins in slow time. As described above, the first velocity estimate data outputted by the doppler module 402 may be ambiguous due to the relatively low unambiguous velocity.

The beamforming and detector module 404 can be configured to perform beamforming and object detection prior to the velocity disambiguation module 116 disambiguating the first velocity estimate data. Thus, the beamforming and detector module 404 can reduce an amount of data over which the velocity disambiguation module 116 operates; yet, it is contemplated that the claimed subject matter is not limited to performing beamforming and detection prior to the velocity disambiguation module 116 disambiguating the first velocity estimate data.

In the example of FIG. 4, the velocity disambiguation module 116 performs a disambiguation technique as a post processing step (e.g., subsequent to the doppler module 402 computing the first velocity estimate data such that the first velocity estimate data can be disambiguated). However, it is contemplated that the post processing approach performed by the velocity disambiguation module 116 described below can instead be extended to a scenario where the velocity disambiguation module 116 computes velocity estimate data in place of the doppler module 402 (e.g., without the doppler module 402 computing the first velocity estimate data based on the N samples across the ramps for each of the range bins).

The velocity disambiguation module 116 can be configured to divide samples from a period of a ramp into a plurality of groups of the samples respectively from periods of subramps. The velocity disambiguation module 116 can similarly divide the samples for each of the ramps in the sequence included in the radar signal (e.g., in the CPI). According to the example shown in FIG. 3, each ramp can be divided into four subramps. Following this example, the L samples from a ramp can be divided into four groups of L/4 samples; each group of L/4 samples can correspond to a particular subramp. Further following this example, the samples of each of the N ramps can be similarly divided into groups of samples respectively from periods of subramps within the ramps. It is to be appreciated, however, that the claimed subject matter is not limited to dividing ramps into four subramps, as other numbers of subramps can be formed from each ramp.

Moreover, the velocity disambiguation module 116 can be configured to disambiguate the first velocity estimate data based on the plurality of groups of the samples respectively from the periods of the subramps. The velocity disambiguation module 116 can perform doppler analyses over the samples from the subramps. Further, the processing performed by the velocity disambiguation module 116 can evaluate phase change from subramp to subramp (e.g., to compute a velocity of a target) while also accounting for frequency shifts between subramps (e.g., shift in center frequencies of the subramps). Since the velocity disambiguation module 116 can operate utilizing the subramps, the unambiguous velocity value can be based on a PRI of the subramps (e.g., period of the subramps) as opposed to the PRI the full ramps. Since the time between the subramps is smaller than the time between the ramps, the velocity disambiguation module 116 can compute velocity estimate data having a larger unambiguous velocity.

According to an example, samples from a common sequence of ramps can be utilized by the range module 114, the doppler module 402, and the velocity disambiguation module 116. Following this example, the range module 114 and the doppler module 402 can compute the first range estimate data and the first velocity estimate data based on the samples from the sequence of ramps. Further following this example, the velocity disambiguation module 116 can also disambiguate the first velocity estimate data utilizing the samples from the same sequence of ramps.

Pursuant to another example, the range module 114 and the doppler module 402 can compute the first range estimate data and the first velocity estimate data based on samples from a first sequence of ramps. Following this example, the velocity disambiguation module 116 can disambiguate the first velocity estimate data utilizing samples from a second sequence of ramps (where the second sequence of ramps are divided into subramps as described herein).

Figure 5:
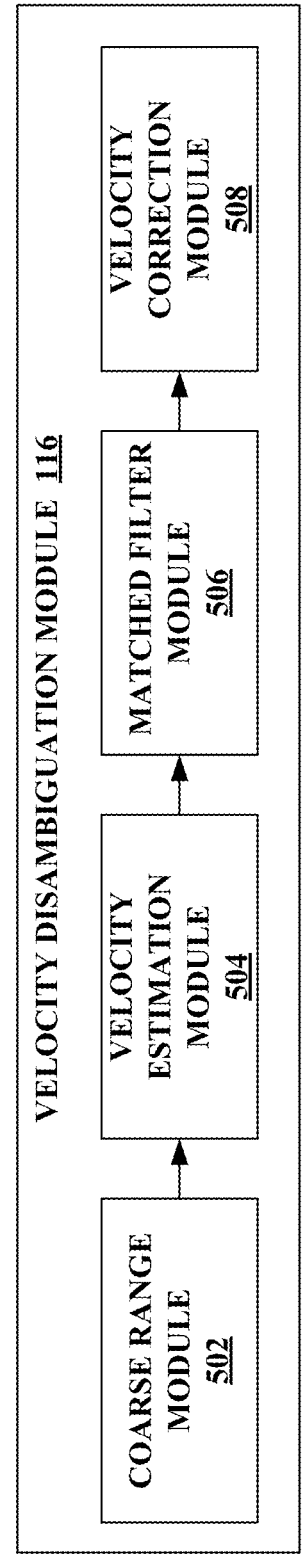
FIG. 5 illustrates an example of a velocity disambiguation module of the radar processing circuitry.

With reference to FIG. 5, illustrated is an example of the velocity disambiguation module 116 in further detail. The velocity disambiguation module 116 can include a coarse range module 502, a velocity estimation module 504, a matched filter module 506, and a velocity correction module 508. The coarse range module 502 can be configured to compute second range estimate data based on the groups of the samples respectively from the periods of the subramps. The coarse range module 502 can apply an FFT along the samples from a single subramp. Further, the coarse range module 502 can similarly apply FFTs along the samples respectively from the other subramps. Pursuant to the example where a ramp is divided into four subramps, it follows that the coarse range module 502 can apply an FFT along the L/4 samples from a single subramp in fast time; the foregoing can be repeated for each subramp. The second range estimate data generated by the coarse range module 502 based on the samples respectively along the subramps can have a larger range resolution compared to the first range estimate data generated by the range module 114 based on the samples respectively along the ramps (e.g., the first range estimate data has finer range resolution compared to the second range estimate data). For instance, if each ramp is divided into four subramps, then the range resolution of a coarse range bin of the second range estimate data will be four times larger than the range resolution of a range bin of the first range estimate data. The range module 114 and the coarse range module 502 can apply substantially similar FFTs; however, the coarse range module 502 can apply the FFTs along smaller groups of samples (e.g., fewer samples are included per subramp compared to the number of samples included per ramp).

Moreover, the velocity estimation module 504 can be configured to estimate possible ambiguous velocity values for each target. For instance, for each target detected in the first range estimate data and the first velocity estimate data, the velocity estimation module 504 can identify possible ambiguous velocity values. The possible ambiguous velocity values for each target are based on the velocity of the target from the first velocity estimate data ($V_{target}$) and a value of the unambiguous velocity for the first velocity estimate data ($V_{max}$). According to an example, the velocity estimation module 504 can output an ambiguous velocity vector that includes the possible ambiguous velocity values. The ambiguous velocity vector can be represented as follows:

$$V=[V_{target} V_{target}+V_{max} V_{target}+2*V\text{max} \ldots V_{target}-V\text{max}V_{target}-2*V\text{max} \ldots]$$

The matched filter module 506 is configured to apply a matched filter to adjust for range resolution differences between the second range estimate data and the first range estimate data. The matched filter module 506 can apply the matched filter with the target range estimate in the standard processing ranges. The matched filter module 506 can utilize the first range estimate data computed based on samples along an entire ramp to adjust for the higher range resolution in the second range estimate data computed based on samples along a subramp of the ramp (e.g., a subset of the samples along the ramp). As noted above, each coarse range cell in the second range estimate data computed by the coarse range module 502 based on the samples along the subramps has a larger range resolution as compared to each range cell in the first range estimate data computed by the range module 114 based on the samples along the full ramps. The difference in range resolutions can be a function of a number of times that a ramp is divided. For example, if a ramp is split four times, then the range resolution of a coarse range bin in the second range estimate data can be four times larger; following this example, four fine range values can be used for the matched filter. Accordingly, the matched filter applied by the matched filter module 506 can be represented as:

$$B=\exp(j*2*\text{pi}*2*\text{delta}\_f(k)*(\text{Target}_{range})/c)$$

In the foregoing, B is the fine range estimation and $\text{Target}_{range}$ is a range value of the from the first range estimate data.

Moreover, the velocity correction module 508 disambiguates the first velocity estimate data to output second velocity estimate data. The velocity correction module 508 applies a non-uniform DFT to the possible ambiguous velocity values estimated by the velocity estimation module 504. Again, following the example where a ramp is divided into four subramps, the unambiguous velocity resulting from the velocity disambiguation module 116 can be four times greater than the unambiguous velocity of the first velocity estimate data computed by the doppler module 402. Accordingly, for each detection, the velocity correction module 508 can estimate the velocity at four possible ambiguous positions. The velocity correction module 508 can apply the following DFT to the ambiguous velocity values:

$$DFT_{doppler}=\exp(-j*2*pi*2*k*T*(f0+delta\_f(k))*V/c)$$

The velocity correction module 508, for example, can estimate the corrected velocity value of each target by evaluating the following modified DFT matrix for doppler estimation:

$$Y(p,:)=A*(B.*y(:,p))$$

In the foregoing, A(k,v) is a doppler estimation matrix with size K versus K (e.g., A=exp(-j*2*pi*2*k*T*(fc+delta_f(k))*v/c)) and B(k) is a target range window vector (e.g., B=exp(j*2*pi*2*delta_f(k)*r/c)). Moreover, p is the coarse range value for a target from the second range estimate data and r is the previously estimated range for the target from the first range estimate data.

Figure 6:
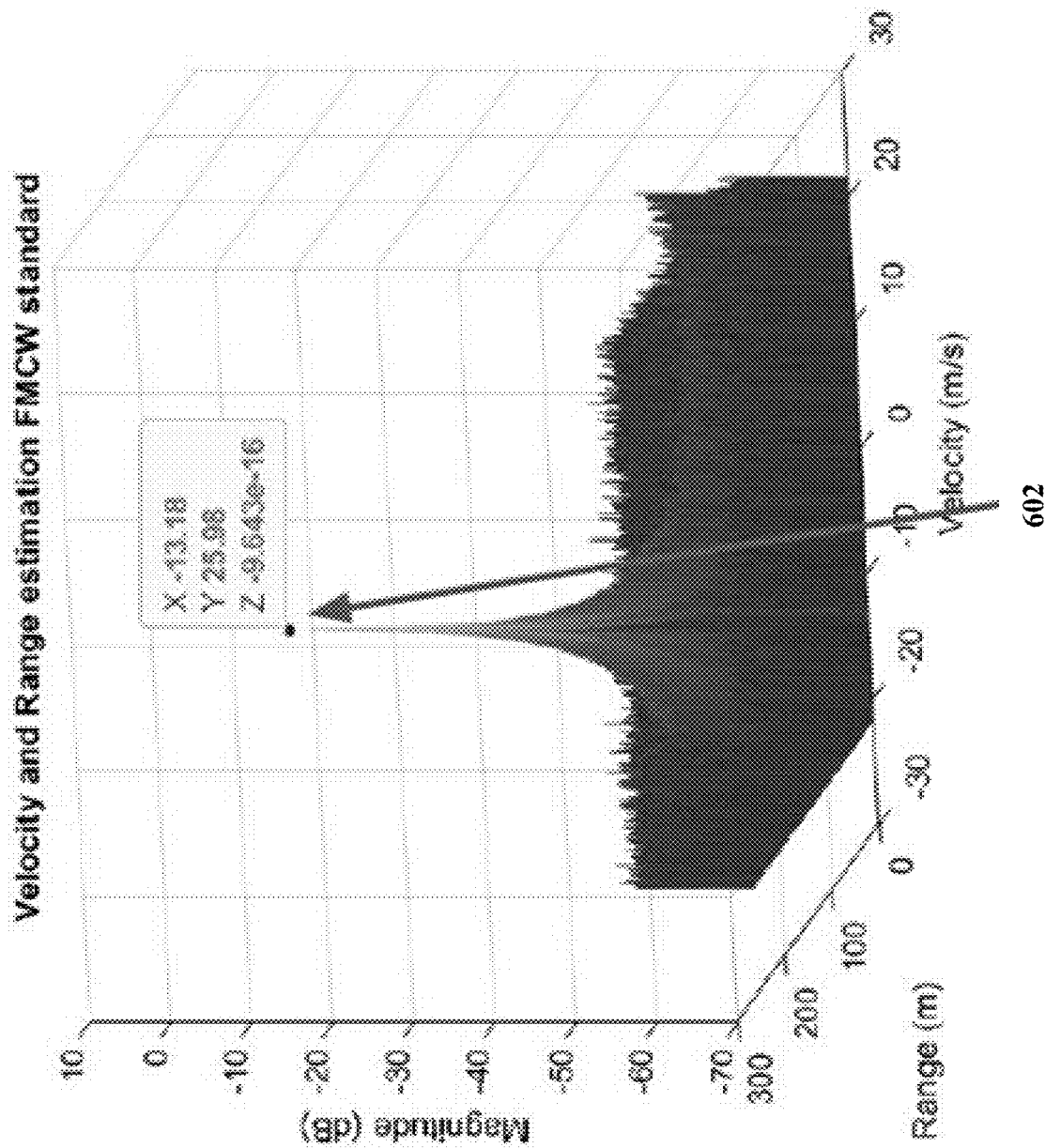
FIG. 6 illustrates an exemplary map of range estimate data and velocity estimate data.

Turning to FIG. 6, illustrated is an exemplary map 600 of first range estimate data and first velocity estimate data. The map 600 can be outputted by the range module 114 and the doppler module 402 (e.g., conventional range and velocity processing). The map 600 can be outputted responsive to detection of a target that is actually at a range of 25.5 meters and has a velocity of 30 m/s in an environment. As illustrated, the target at 602 is computed to be at a range of 25.98 meters. However, a velocity of the target at 602 is computed as being −13.18 m/s due to the unambiguous velocity. More particularly, the unambiguous velocity may allow for detecting a velocity of a target between −20 m/s and 20 m/s in the depicted example of FIG. 6. Thus, rather than detecting that the velocity of the target is 30 m/s (e.g., the actual velocity of the target), the map 600 provides that the velocity of the target in the first velocity estimate data is −13.18 m/s (e.g, an ambiguously estimated velocity).

Figure 7:
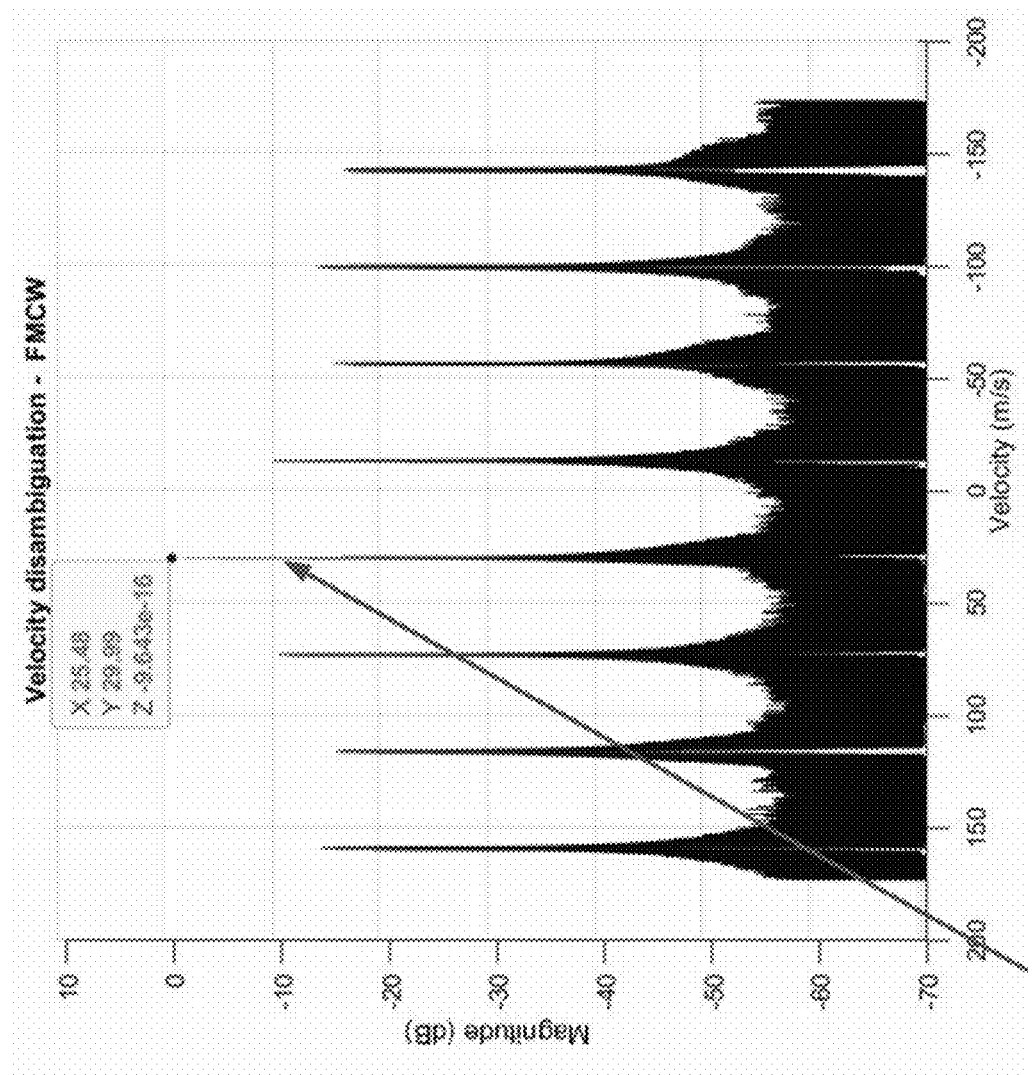
FIG. 7 illustrates an exemplary map depicting velocity disambiguation of the velocity estimate data from the map of FIG. 6.

With reference to FIG. 7, illustrated is an exemplary map 700 depicting velocity disambiguation of the first velocity estimate data from the map 600 of FIG. 6 utilizing the approaches set forth herein. A correct velocity for the target at 702 can be identified as having a highest peak in the map 700. Thus, as shown, by employing the techniques described herein, the velocity of the target can be detected as being 29.99 m/s in this example. According to an example, the velocity of the target can be determined from an output of the DFT set forth herein by identifying a peak having a maximum magnitude.

Figure 8:
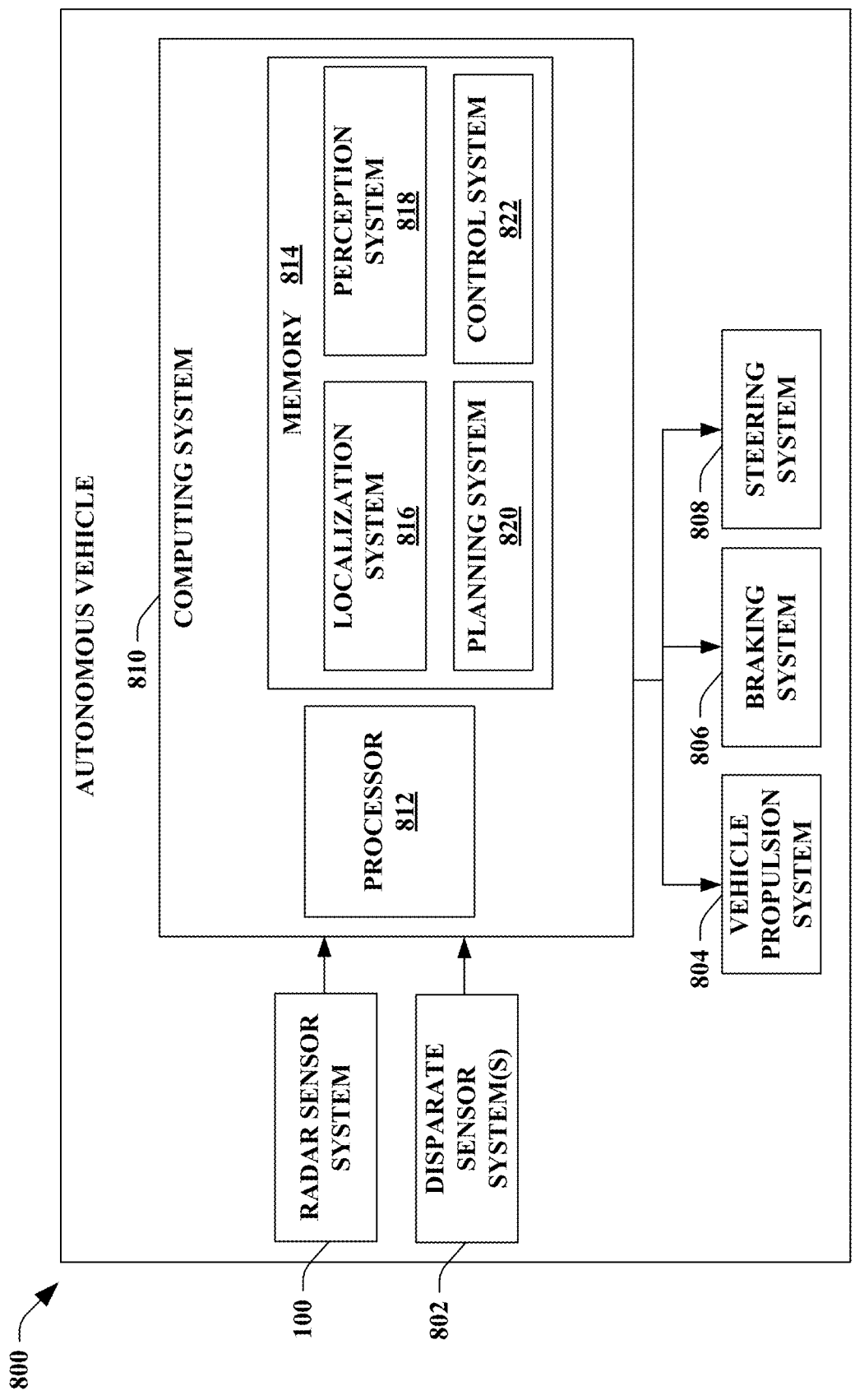
FIG. 8 illustrates a functional block diagram of an exemplary autonomous vehicle that includes the radar sensor system.

Turning to FIG. 8, illustrates an autonomous vehicle 800. The autonomous vehicle 800 can navigate about roadways without human conduction based upon sensor signals outputted by sensor systems of the autonomous vehicle 800. The autonomous vehicle 800 includes a plurality of sensor systems. More particularly, the autonomous vehicle 800 includes the radar sensor system 100. The autonomous vehicle 800 can further include one or more disparate sensor systems 802. The disparate sensor systems 802 can include GPS sensor system(s), ultrasonic sensor sensor(s), infrared sensor system(s), camera system(s), lidar sensor system(s), and the like. The sensor systems 100 and 802 can be arranged about the autonomous vehicle 800.

The autonomous vehicle 800 further includes several mechanical systems that are used to effectuate appropriate motion of the autonomous vehicle 800. For instance, the mechanical systems can include, but are not limited to, a vehicle propulsion system 804, a braking system 806, and a steering system 808. The vehicle propulsion system 804 may be an electric engine or a combustion engine. The braking system 806 can include an engine brake, brake pads, actuators, and/or any other suitable componentry that is configured to assist in decelerating the autonomous vehicle 800. The steering system 808 includes suitable componentry that is configured to control the direction of movement of the autonomous vehicle 800.

The autonomous vehicle 800 additionally includes a computing system 810 that is in communication with the sensor systems 100 and 802, the vehicle propulsion system 804, the braking system 806, and the steering system 808. The computing system 810 includes a processor 812 and memory 814; the memory 814 includes computer-executable instructions that are executed by the processor 812. Pursuant to various examples, the processor 812 can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like.

The memory 814 of the computing system 810 can include a localization system 816, a perception system 818, a planning system 820, and a control system 822. The localization system 816 can be configured to determine a local position of the autonomous vehicle 800. The perception system 818 can be configured to perceive objects nearby the autonomous vehicle 800 (e.g., based on outputs from the sensor systems 100 and 802). For instance, the perception system 818 can detect, classify, and predict behaviors of objects nearby the autonomous vehicle 800. The perception system 818 (and/or differing system(s) included in the memory 814) can track the objects nearby the autonomous vehicle 800 and/or make predictions with respect to the environment in which the autonomous vehicle 800 is operating (e.g., predict the behaviors of the objects nearby the autonomous vehicle 800). Further, the planning system 822 can plan motion of the autonomous vehicle 800. Moreover, the control system 822 can be configured to control at least one of the mechanical systems of the autonomous vehicle 800 (e.g., at least one of the vehicle propulsion system 804, the braking system 806, and/or the steering system 808).

The computing system 810 can receive the range estimate data computed by the range module 114 and the velocity estimate data computed by the velocity disambiguation module 116 of the radar sensor system 100. Further, an operation of the autonomous vehicle 800 can be controlled by the computing system 810 based on the range estimate data and the velocity estimate data. While the radar sensor system 100 is described as being included as part of the autonomous vehicle 800 in FIG. 8, it is contemplated that the radar sensor system 100 can be utilized in other types of scenarios (e.g., included in other types of systems, etc.).

Figure 9:
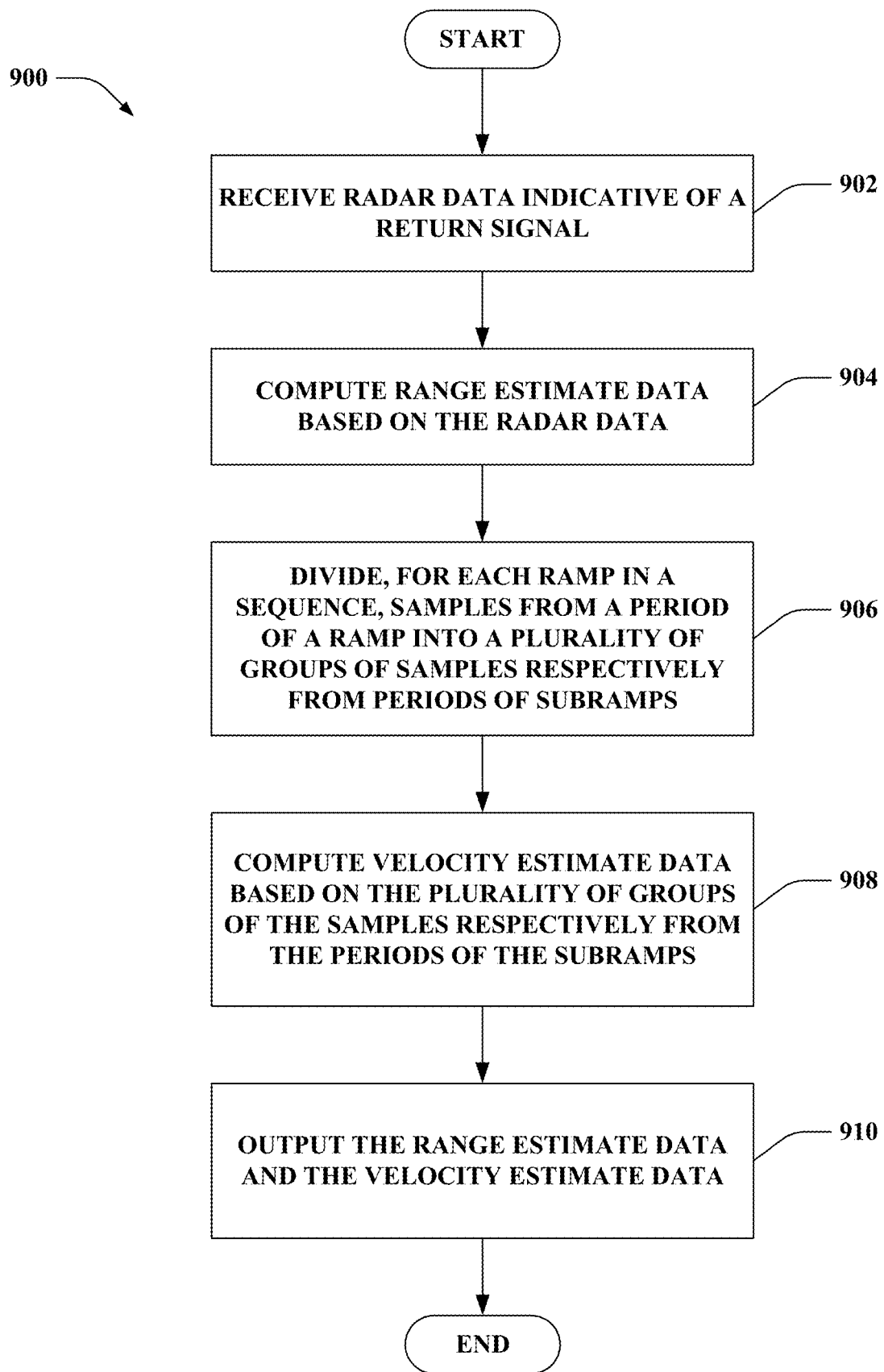
FIG. 9 is a flow diagram that illustrates an exemplary methodology performed by a radar sensor system.
Figure 10:
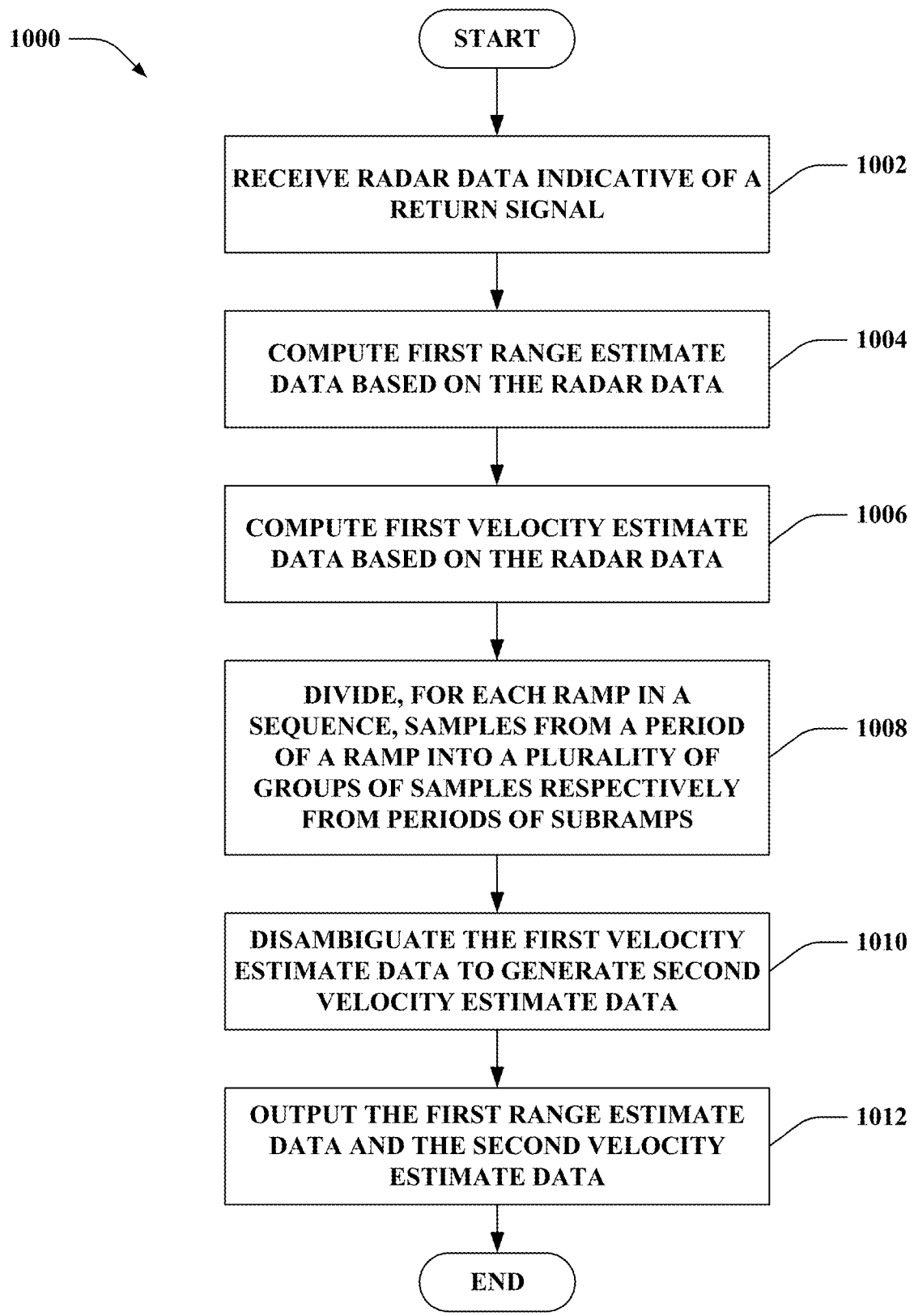
FIG. 10 is a flow diagram that illustrates an exemplary methodology performed by a radar sensor system to disambiguate velocity estimate data.

FIGS. 9-10 illustrate exemplary methodologies relating to disambiguating velocity estimate data of a radar sensor system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 performed by a radar sensor system. At 902, radar data indicative of a return signal can be received. The return signal can be received from an environment of the radar sensor system responsive to a radar signal. The radar signal can include a sequence of ramps, where each of the ramps has a bandwidth and a period. At 904, range estimate data can be computed based on the radar data. The range estimate data can be computed based on samples from a period of a ramp for each of the ramps. At 906, samples from a period of a ramp, for each of the ramps in the sequence, can be divided into a plurality of groups of the samples respectively from the periods of subramps. At 908, velocity estimate data can be computed based on the plurality of groups of the samples respectively from the periods of the subramps. At 910, the range estimate data and the velocity estimate data can be outputted.

FIG. 10 illustrates another methodology 1000 performed by a radar sensor system to disambiguate velocity estimate data. At 1002, radar data indicative of a return signal can be received. The return signal can be received from an environment of the radar sensor system responsive to a radar signal. The radar signal can include a sequence of ramps, where each of the ramps has a bandwidth and a period. At 1004, first range estimate data can be computed based on the radar data. The first range estimate data can be computed based on samples from a period of a ramp for each of the ramps. At 1006, first velocity estimate data can be computed based on the radar data. The first velocity estimate data can be computed based on samples from a range bin across the ramps in the sequence for each range bin. At 1008, samples from a period of a ramp, for each of the ramps in the sequence, can be divided into a plurality of groups of the samples respectively from the periods of the subramps. At 1010, the first velocity estimate data can be disambiguated to generate second velocity estimate data. The first velocity estimate data can be disambiguated based on the plurality of groups of the samples respectively from the periods of the subramps. At 1012, the first range estimate data and the second velocity estimate data can be outputted.

Figure 11:
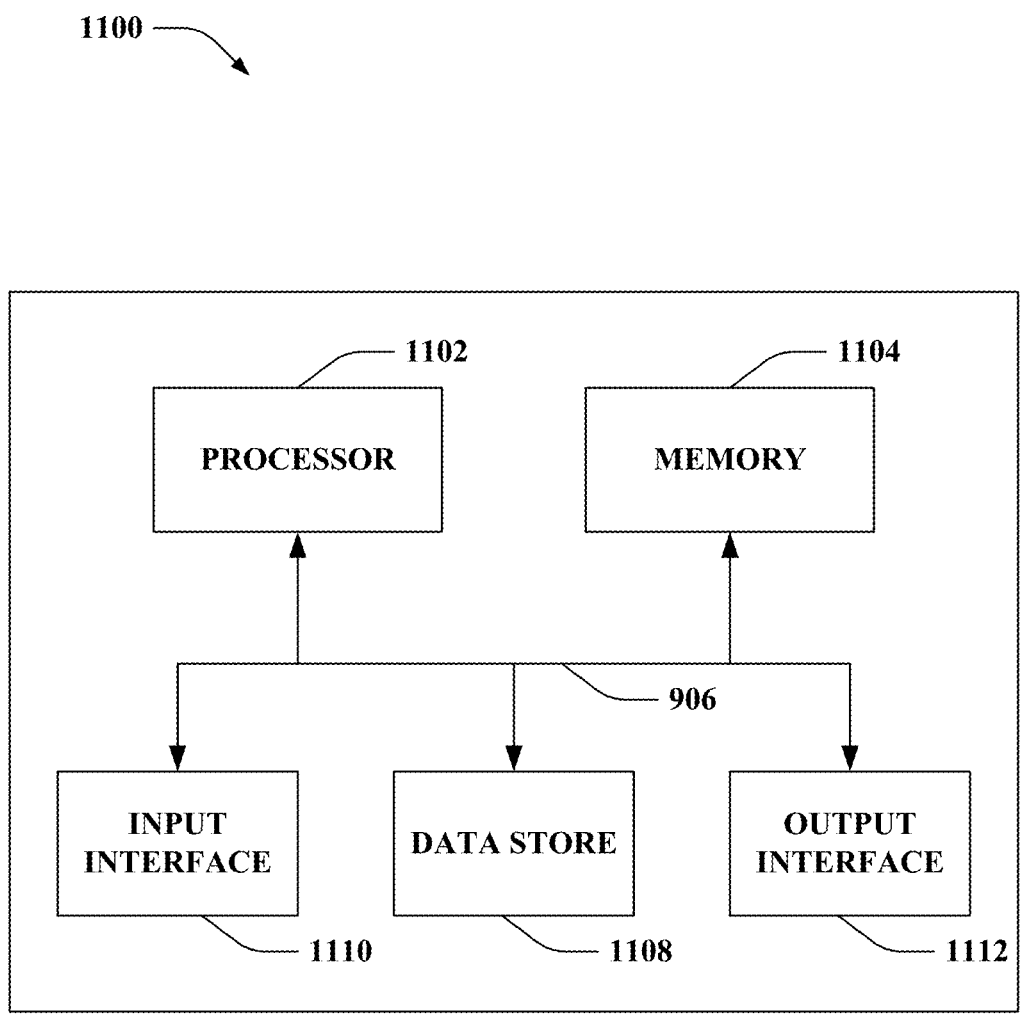
FIG. 11 illustrates an exemplary computing device.

Referring now to FIG. 11, a high-level illustration of an exemplary computing device 1100 that can be used in accordance with the systems and methodologies disclosed herein is illustrated. For instance, the computing device 1100 may be or include the computing system 810. The computing device 1100 includes at least one processor 1102 that executes instructions that are stored in a memory 1104. The instructions may be, for instance, instructions for implementing functionality described as being carried out by one or more systems discussed above or instructions for implementing one or more of the methods described above. The processor 1102 may be a GPU, a plurality of GPUs, a CPU, a plurality of CPUs, a multi-core processor, etc. The processor 1102 may access the memory 1104 by way of a system bus 1106. In addition to storing executable instructions, the memory 1104 may also store passenger profiles, information pertaining to passengers, information pertaining to a ride-sharing trip, and so forth.

The computing device 1100 additionally includes a data store 1108 that is accessible by the processor 1102 by way of the system bus 1106. The data store 1108 may include executable instructions, passenger profiles, information pertaining to passengers, information pertaining to a ride-sharing trip, etc. The computing device 1100 also includes an input interface 1110 that allows external devices to communicate with the computing device 1100. For instance, the input interface 1110 may be used to receive instructions from an external computer device, etc. The computing device 1100 also includes an output interface 1112 that interfaces the computing device 1100 with one or more external devices. For example, the computing device 1100 may transmit control signals to the vehicle propulsion system 804, the braking system 806, and/or the steering system 808 by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Systems and methods have been described herein in accordance with at least the examples set forth below.

(A1) In one aspect, a radar sensor system is disclosed herein. The radar sensor system includes a transmit antenna configured to transmit a radar signal into an environment of the radar sensor system, where the radar signal comprises a sequence of ramps, and each of the ramps has a bandwidth and a period. The radar sensor system further includes a receive antenna configured to receive a return signal from the environment of the radar sensor system responsive to the radar signal. Moreover, the radar sensor system includes radar processing circuitry that is configured to perform various acts. The acts include receiving radar data indicative of the return signal received at the receive antenna. The acts also include computing first range estimate data based on the radar data, where the first range estimate data is computed based on samples from a period of a ramp for each of the ramps. Moreover, the acts include computing first velocity estimate data based on the radar data, where the first velocity estimate data is computed based on samples from a range bin across the ramps in the sequence for each range bin. The acts also include dividing, for each of the ramps in the sequence, samples from a period of a ramp into a plurality of groups of the samples respectively from periods of subramps. The acts additionally include disambiguating the first velocity estimate data to generate second velocity estimate data, where the first velocity estimate data is disambiguated based on the plurality of groups of the samples respectively from the periods of the subramps. The acts further include outputting the first range estimate data and the second velocity estimate data.

(A2) In some embodiments of the radar sensor system of (A1), an unambiguous velocity of the second velocity estimate data is greater than an unambiguous velocity of the first velocity estimate data.

(A3) In some embodiments of at least one of the radar sensor systems of (A1)-(A2), disambiguating the first velocity estimate data to generate the second velocity estimate data further comprises evaluating phase change from subramp to subramp while accounting for frequency shifts between the subramps.

(A4) In some embodiments of at least one of the radar sensor systems of (A1)-(A3), an unambiguous velocity of the second velocity estimate data is based on a pulse repetition interval of the subramps.

(A5) In some embodiments of at least one of the radar sensor systems of (A1)-(A4), disambiguating the first velocity estimate data further comprises computing second range estimate data based on the groups of the samples respectively from the periods of the subramps; estimating possible ambiguous velocity values for a target detected in the first range estimate data and the first velocity estimate data; applying a matched filter to adjust for range resolution differences between the second range estimate data and the first range estimate data; and disambiguating the first velocity estimate data to generate the second velocity estimate data by applying a non-uniform discrete Fourier transform (DFT) to the possible ambiguous velocity values for the target.

(A6) In some embodiments of at least one of the radar sensor systems of (A1)-(A5), the radar signal is a frequency modulated continuous wave (FMCW) radar signal.

(A7) In some embodiments of at least one of the radar sensor systems of (A1)-(A6), the radar sensor system further includes a mixer configured to mix the radar signal and the return signal to output a mixed signal.

(A8) In some embodiments of at least one of the radar sensor systems of (A1)-(A7), the radar sensor system further includes an analog to digital converter (ADC) configured to sample the mixed signal to output the radar data.

(A9) In some embodiments of at least one of the radar sensor systems of (A1)-(A8), the radar sensor system is included in an autonomous vehicle (AV).

(B1) In another aspect, a method performed by a radar sensor system is disclosed herein, where the method includes receiving radar data indicative of a return signal, where the return signal is received from an environment of the radar sensor system responsive to a radar signal, the radar signal comprises a sequence of ramps, and each of the ramps has a bandwidth and a period. The method also includes computing range estimate data based on the radar data, where the range estimate data is computed based on samples from a period of a ramp for each of the ramps. Moreover, the method includes dividing, for each of the ramps in the sequence, samples from a period of a ramp into a plurality of groups of the samples respectively from periods of subramps. The method additionally includes computing velocity estimate data based on the plurality of groups of the samples respectively from the periods of the subramps. Further, the method includes outputting the range estimate data and the velocity estimate data.

(B2) In some embodiments of the method of (B1), the method further includes computing initial velocity estimate data based on the radar data, the initial velocity estimate data being computed based on samples from a range bin across the ramps in the sequence for each range bin. Moreover, computing the velocity estimate data based on the plurality of groups of the samples respectively from the periods of the subramps comprises disambiguating the initial velocity estimate data to generate the velocity estimate data.

(B3) In some embodiments of at least one of the methods of (B1)-(B2), an unambiguous velocity of the velocity estimate data is greater than an unambiguous velocity of the initial velocity estimate data.

(B4) In some embodiments of at least one of the methods of (B1)-(B3), computing the velocity estimate data further comprises evaluating phase change from subramp to subramp while accounting for frequency shifts between the subramps.

(B5) In some embodiments of at least one of the methods of (B1)-(B4), an unambiguous velocity of the velocity estimate data is based on a pulse repetition interval of the subramps.

(B6) In some embodiments of at least one of the methods of (B1)-(B5), a range resolution of the range estimate data is based on the bandwidth of the ramps.

(B7) In some embodiments of at least one of the methods of (B1)-(B6), the method further includes transmitting the radar signal into the environment from the radar sensor system; receiving the return signal from the environment; mixing the radar signal and the return signal to output a mixed signal; and sampling the mixed signal to output the radar data.

(B8) In some embodiments of at least one of the methods of (B1)-(B7), the radar signal is a frequency modulated continuous wave (FMCW) radar signal.

(C1) In yet another aspect, an autonomous vehicle is disclosed herein, where the autonomous vehicle includes a radar sensor system and a computing system that is in communication with the radar sensor system. The radar sensor system includes radar processing circuitry that is configured to perform various acts. The acts performed by the radar processing circuitry include receiving radar data indicative of a return signal, where the return signal is received from an environment of the radar sensor system responsive to a radar signal, the radar signal comprises a sequence of ramps, and each of the ramps has a bandwidth and a period. The acts performed by the radar processing circuitry also include computing first range estimate data based on the radar data, the first range estimate data being computed based on samples from a period of a ramp for each of the ramps. Moreover, the acts performed by the radar processing circuitry include computing first velocity estimate data based on the radar data, the first velocity estimate data being computed based on samples from a range bin across the ramps in the sequence for each range bin. The acts performed by the radar processing circuitry also include dividing, for each of the ramps in the sequence, samples from a period of a ramp into a plurality of groups of the samples respectively from periods of subramps. Moreover, the acts performed by the radar processing circuitry include disambiguating the first velocity estimate data to generate second velocity estimate data, the first velocity estimate data being disambiguated based on the plurality of groups of the samples respectively from the periods of the subramps. The acts performed by the radar processing circuitry also include outputting the first range estimate data and the second velocity estimate data. Moreover, the computing system of the autonomous vehicle includes a processor and memory that stores computer-executable instructions that, when executed by the processor, cause the processor to perform various acts. The acts performed by the computing system of the autonomous vehicle include receiving the first range estimate data and the second velocity estimate data from the radar sensor system. Moreover, the acts performed by the computing system of the autonomous vehicle include controlling an operation of the autonomous vehicle based on the first range estimate data and the second velocity estimate data.

(C2) In some embodiments of the autonomous vehicle of (C1), disambiguating the first velocity estimate data to generate the second velocity estimate data further comprises evaluating phase change from subramp to subramp while accounting for frequency shifts between the subramps.

(C3) In some embodiments of at least one of the autonomous vehicles of (C1)-(C2), disambiguating the first velocity estimate data further comprises computing second range estimate data based on the groups of the samples respectively from the periods of the subramps; estimating possible ambiguous velocity values for a target detected in the first range estimate data and the first velocity estimate data; applying a matched filter to adjust for range resolution differences between the second range estimate data and the first range estimate data; and disambiguating the first velocity estimate data to generate the second velocity estimate data by applying a non-uniform discrete Fourier transform (DFT) to the possible ambiguous velocity values for the target.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A radar sensor system, comprising:
    a transmit antenna configured to transmit a radar signal into an environment of the radar sensor system, the radar signal comprises a sequence of ramps, each of the ramps having a bandwidth and a period;
    a receive antenna configured to receive a return signal from the environment of the radar sensor system responsive to the radar signal; and
    radar processing circuitry that is configured to perform acts comprising:
        receiving radar data indicative of the return signal received at the receive antenna;
        computing first range estimate data based on the radar data, the first range estimate data being computed based on samples from a period of a ramp for each of the ramps;
        computing first velocity estimate data based on the radar data, the first velocity estimate data being computed based on samples from a range bin across the ramps in the sequence for each range bin;
        dividing, for each of the ramps in the sequence, the samples from the period of the ramp into a plurality of groups of the samples respectively from periods of subramps, wherein each subramp has a portion of the bandwidth of the ramp and a portion of the period of the ramp;
        evaluating, by applying a non-uniform discrete Fourier transform (DFT), the plurality of groups to determine phase changes between consecutive subramps within each ramp, the non-uniform DFT accounting for frequency shifts between the consecutive subramps;
        disambiguating the first velocity estimate data to generate second velocity estimate data based on the phase changes determined between consecutive subramps within each ramp; and
        outputting the first range estimate data and the second velocity estimate data.

2. The radar sensor system of claim 1, wherein an unambiguous velocity of the second velocity estimate data is greater than an unambiguous velocity of the first velocity estimate data.

3. The radar sensor system of claim 1, wherein an unambiguous velocity of the second velocity estimate data is based on a pulse repetition interval of the subramps.

4. The radar sensor system of claim 1, wherein disambiguating the first velocity estimate data comprises:
    computing second range estimate data based on the groups of the samples respectively from the periods of the subramps;
    estimating possible ambiguous velocity values for a target in the first range estimate data and the first velocity estimate data;
    applying a matched filter to adjust for range resolution differences between the second range estimate data and the first range estimate data; and
    disambiguating the first velocity estimate data to generate the second velocity estimate data by applying the non-uniform DFT to the possible ambiguous velocity values for the target.

5. The radar sensor system of claim 1, wherein the radar signal is a frequency modulated continuous wave (FMCW) radar signal.

6. The radar sensor system of claim 1, further comprising a mixer configured to mix the radar signal and the return signal to output a mixed signal.

7. The radar sensor system of claim 6, further comprising an analog to digital converter (ADC) configured to sample the mixed signal to output the radar data.

8. The radar sensor system of claim 1 being included in an autonomous vehicle (AV).

9. A method performed by a radar sensor system, comprising:
receiving radar data indicative of a return signal, the return signal received from an environment of the radar sensor system responsive to a radar signal, the radar signal comprises a sequence of ramps, each of the ramps having a bandwidth and a period;
computing range estimate data based on the radar data, the range estimate data being computed based on samples from a period of a ramp for each of the ramps;
computing first velocity estimate data based on the radar data, the first velocity estimate data being computed based on samples from a range bin across the ramps in the sequence for each range bin;
dividing, for each of the ramps in the sequence, samples from a period of a ramp into a plurality of groups of the samples respectively from periods of subramps, wherein each subramp has a portion of the bandwidth of the ramp and a portion of the period of the ramp;
evaluating, by applying a non-uniform discrete Fourier transform (DFT), the plurality of groups to determine phase changes between consecutive subramps within each ramp, the non-uniform DFT accounting for frequency shifts between the consecutive subramps;
disambiguating the first velocity estimate data to generate second velocity estimate data based on the phase changes determined between consecutive subramps within each ramp; and
outputting the range estimate data and the second velocity estimate data.

10. The method of claim 9, wherein an unambiguous velocity of the second velocity estimate data is greater than an unambiguous velocity of the first velocity estimate data.

11. The method of claim 9, wherein an unambiguous velocity of the second velocity estimate data is based on a pulse repetition interval of the subramps.

12. The method of claim 9, wherein a range resolution of the range estimate data is based on the bandwidth of the ramps.

13. The method of claim 9, further comprising:
transmitting the radar signal into the environment from the radar sensor system;
receiving the return signal from the environment;
mixing the radar signal and the return signal to output a mixed signal; and
sampling the mixed signal to output the radar data.

14. The method of claim 9, wherein the radar signal is a frequency modulated continuous wave (FMCW) radar signal.

15. An autonomous vehicle, comprising:
a radar sensor system, comprising:
radar processing circuitry that is configured to perform acts comprising:
receiving radar data indicative of a return signal, the return signal received from an environment of the radar sensor system responsive to a radar signal, the radar signal comprises a sequence of ramps, each of the ramps having a bandwidth and a period;
computing first range estimate data based on the radar data, the first range estimate data being computed based on samples from a period of a ramp for each of the ramps;
computing first velocity estimate data based on the radar data, the first velocity estimate data being computed based on samples from a range bin across the ramps in the sequence for each range bin;
dividing, for each of the ramps in the sequence, samples from a period of a ramp into a plurality of groups of the samples respectively from periods of subramps, wherein each subramp has a portion of the bandwidth of the ramp and a portion of the period of the ramp;
evaluating, by applying a non-uniform discrete Fourier transform (DFT), the plurality of groups to determine phase changes between consecutive subramps within each ramp, the non-uniform DFT accounting for frequency shifts between the consecutive subramps;
disambiguating the first velocity estimate data to generate second velocity estimate data based on the phase changes determined between consecutive subramps within each ramp; and
outputting the first range estimate data and the second velocity estimate data; and
a computing system that is in communication with the radar sensor system, wherein the computing system comprises:
a processor; and
memory that stores computer-executable instructions that, when executed by the processor, cause the processor to perform acts comprising:
receiving the first range estimate data and the second velocity estimate data from the radar sensor system; and
controlling an operation of the autonomous vehicle based on the first range estimate data and the second velocity estimate data.

16. The autonomous vehicle of claim 15, wherein disambiguating the first velocity estimate data comprises:
computing second range estimate data based on the groups of the samples respectively from the periods of the subramps;
estimating possible ambiguous velocity values for a target in the first range estimate data and the first velocity estimate data;
applying a matched filter to adjust for range resolution differences between the second range estimate data and the first range estimate data; and
disambiguating the first velocity estimate data to generate the second velocity estimate data by applying the non-uniform DFT to the possible ambiguous velocity values for the target.

* * * * *